UNITED STATES PATENT OFFICE.

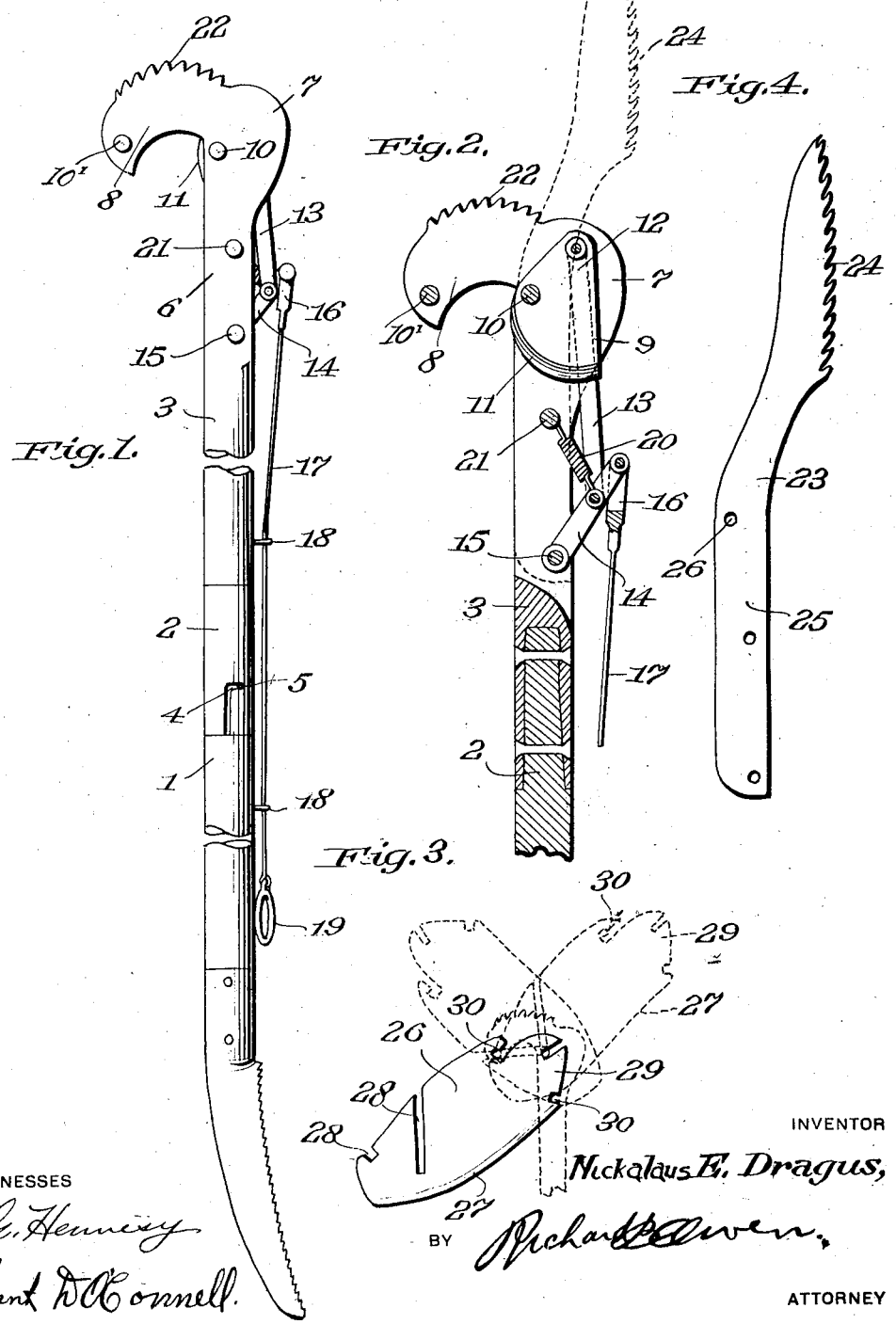

NICKALAUS E. DRAGUS, OF FREMONT, OHIO.

PRUNING IMPLEMENT.

1,338,216.

Specification of Letters Patent. Patented Apr. 27, 1920.

Application filed March 17, 1917. Serial No. 155,546.

*To all whom it may concern:*

Be it known that I, NICKALAUS E. DRAGUS, a citizen of the United States, residing at Fremont, in the county of Sandusky and State of Ohio, have invented certain new and useful Improvements in Pruning Implements, of which the following is a specification.

This invention relates to pruning implements and the like and more particularly to improvements therein adapted to broaden the field of utility of such devices, whereby they may be more frequently and advantageously employed.

An object of the invention is the provision of an implement of this character which is capable of an efficient performance in the pruning of shrubbery and vines, as well as when used for pruning fruit trees and such.

A further object is to provide a device of this character having separable working elements of various characters, said elements adapted for association with said pruning implement and adapting the latter to some particular class of work or service.

With the above and other objects in view, this invention consists in the details of construction, arrangement and combination of parts as will be hereinafter more fully referred to in the following specification and pointed out in the drawings, in which—

Figure 1 is a view showing my invention in its assembled form, ready for use,

Fig. 2 is a fragmentary view of the upper portion of the pruning implement, a portion thereof being shown in sections to illustrate the position and arrangement of the working part, Fig. 3 is a detail view of a cutting element adapted for association with the pruning implement, the respective positions of the same in its attachment to the implement being indicated by dotted outlines, and Fig. 4 is a detail view of a cutting element also adapted for association with the pruning implement, as indicated in dotted lines in Fig. 2 of the drawings.

In carrying out my invention, I provide a handle or supporting standard 1 adapted to receive on its upper end a ferrule 2 at the lower end of the member 3. The ferrule is fastened to the standard 1 by means of a bayonet slot 4 and pin 5. The member 3 has its upper end consisting of a pair of spaced vertically extending branches 6 having their extreme ends widened to form a head as indicated at 7 and provided with forwardly extending hooked ends 8. When using the implement, the ends 8 are adapted to be hooked over the bough or branch which is to be cut so that when the cutting blade 9 is brought to bear against the bough, the latter will be firmly engaged by the curved ends 8 until it is severed by the blade 9.

The blade 9 which, as has been intimated, is for the purpose of cutting the portions of the tree, vine or shrubbery which in being trimmed, is pivotally mounted upon the bolt 10 supported transversely between and connecting the branches 6 in proximity to the curved ends 8. This member 9 is provided with an enlarged and curved cutting edge 11 eccentric to the pivot 10 while the shank portion is tapered to form a reduced end 12. A connecting link 13 has one end pivotally connected to the shank 12 of the cutting blade, while its other end is pivotally secured to a movable lever 14, the latter being pivotally supported upon a bolt 15 which extends transversely between the branches 6 of the pruning implement as illustrated. The outer free end of the lever 14 is engaged by the bifurcated end 16 of an operating rod 17 which extends longitudinally of the device being movably supported in connection therewith by means of brackets or staples 18. Suitable gripping means 19 are provided at the lower end of the operating rod 17 so that the latter may be reciprocated for properly causing the blade 9 to be moved about its pivot so that its cutting edge 11 is brought to bear against the object within the hooked end 8 of the implement. To facilitate the cutting operation as just described, and to normally retain the cutter 9 in position within the head portion 7 of the branches 6, suitable tensioning means 20 are employed. As shown in the present instance, this may consist of a coil spring, one end of which is adapted to be connected to a bolt 21 connecting the branches 6 and midway of the bolts 10 and 15 previously referred to. The other end of the coil spring is secured to the lever 14 so that upon the movement of the latter, the spring will be expanded with the result that when the operator lets go of the handle 19, the spring will cause the lever 14 to move upwardly again to its normal position, in the doing of which the cutter 9 is swung to its position within the head 7 and out of engagement with the hooked ends 8 as well as out of position where it will be in the operator's way while placing the implement for the next cut.

The upper marginal edges of the hooked ends 8 are provided with saw teeth 22 so that when a particularly tough bough or branch is encountered, especially when trimming fruit trees and the like, the teeth 22 may be reciprocated across the bough so as to operate upon the latter in the same manner as a saw. In this way, a sufficient trench or groove can be frequently cut in the bough to permit the cutter 9 to obtain a grip thereon for cutting through the latter.

As a means for further facilitating the trimming of the tree, I provide an auxiliary sawing cutter 23 provided with a saw edge 24 and the shank 25. Suitable openings 26 are provided in the shank for the reception of the bolts 10, 21, 15 when the sawing element is to be secured to one of the branches 6 of the device. When so positioned it will be noted that the saw portion 24 extends upwardly beyond the hooked ends 8 with the saw edge in a substantially vertical plane so that the entire device may be properly reciprocated for drawing the saw teeth across the bough for sawing through the latter when it is impossible to sever the same by means of a cutter 9. It is often desirable that a stationary or fixed cutter be carried at the upper end of the pruning implement and for this purpose I have provided an auxiliary knife cutter 26 having one of its edges sharpened to provide a cutting edge 27. This cutter has one of its ends provided with a deep notch and a shallow notch 28, while the other end is cut away to provide an end portion 29 slotted inwardly of its outer edge and having notches 30 provided in proximity to each of its opposite longitudinal edges. These several notches are adapted for engagement with the transversely extending bolts 10, 10' and 21 of the branches 6 and when selectively connected thereto as indicated by the dotted lines of Fig. 3, it will be seen that the cutting edge 27 thereof may be disposed to extend at various angles from the upper end of the pruning implement to enable the latter to be used for various purposes, such as for hacking off small swigs of branches which may be located at some secluded spot ordinarily difficult of accessibility and which probably could not be reached by the ordinary implement in such a manner as to, at the same time, permit of the ready operation of its movable parts.

It may be seen from the above that I have provided a pruning implement which is capable of efficient operation and which may be readily used for trimming trees even of the greatest height, since my invention can be readily adjustable in height desired. It is further to be understood that the improvement embodied in my invention is particularly adapted for use in connection with my previous invention of a pruning saw patented March 28, 1916 and covered by Letters Patent 1,117,024.

Having thus described my invention what I claim as new and desire to secure by Letters Patent is:—

In an auxiliary cutter for pruning implement, the combination with an implement head having a plurality of non-alined bolts extending transversely through the head; of an elongated blade having a deep notch and an adjacent shallow notch at one end and having its opposite end centrally slotted and equipped with notches at opposite sides of the said slotted end, said notches and slotted end being adapted for selective engagement with the said non-alined bolts for attaching and maintaining the said blade at different angles on the said head.

In testimony whereof I affix my signature in presence of two witnesses.

NICKALAUS E. DRAGUS.

Witnesses:
CARL DURNWALD.
JOSEPH T. SCHWARTZ.